United States Patent [19]

Brkovic

[11] Patent Number: 5,734,564
[45] Date of Patent: Mar. 31, 1998

[54] HIGH-EFFICIENCY SWITCHING POWER CONVERTER

[75] Inventor: Milivoje Slobodan Brkovic, Plano, Tex.

[73] Assignee: Lucent Technologies Inc., Murray Hill, N.J.

[21] Appl. No.: 688,746

[22] Filed: Jul. 26, 1996

[51] Int. Cl.[6] .................................................. H02M 3/335
[52] U.S. Cl. ................................................ 363/21; 363/20
[58] Field of Search .................................. 363/16, 18, 19, 363/20, 21, 97, 131; 323/299, 301, 303

[56] References Cited

U.S. PATENT DOCUMENTS

| | | | |
|---|---|---|---|
| 3,725,739 | 4/1973 | Griffey | 307/252 |
| 4,628,429 | 12/1986 | Walker | 363/21 |
| 4,688,158 | 8/1987 | Peterson et al. | 363/21 |
| 5,453,921 | 9/1995 | Shutts | 363/21 |

*Primary Examiner*—Matthew V. Nguyen

[57] ABSTRACT

For use with a power supply having a controllable switch that switches in response to a drive signal received from a drive signal generator, a circuit for, and method of, modifying the drive signal to cause the switch to turn on at a reduced voltage. The circuit includes: (1) a synchronization signal generating circuit that senses an electrical characteristic of the supply representing a voltage across the switch, the synchronization signal generating circuit developing a synchronization signal as a function of the characteristic and (2) a drive signal modifier circuit that receives the synchronization signal and causes the drive signal generator to modify the drive signal in response thereto, the synchronization signal generating circuit and drive signal generator cooperating to synchronize the drive signal to the characteristic thereby to reduce power dissipation in the switch.

21 Claims, 11 Drawing Sheets

HIGH-EFFICIENCY SWITCHING POWER CONVERTER

TECHNICAL FIELD OF THE INVENTION

The present invention is directed, in general, to power supplies and, more specifically, to a high efficiency switching power converter and a method of operation thereof.

BACKGROUND OF THE INVENTION

The development of high-efficiency power supplies in combination with a requirement of higher power density is a continuing goal in the field of power electronics. A switched-mode power converter is frequently employed in power supplies to convert an input voltage waveform into a specified output voltage waveform. Switched-mode power converters are also employed in power supplies to provide a stable, well-regulated output voltage.

A switched-mode power converter may be employed in a number of different power supply applications. For instance, a power supply coupled to a battery reserve system in wireless telecommunications equipment is one application for switched-mode power converters. The battery reserve system provides input power to the power supply in the event that primary power from a commercially available source is interrupted. Switched-mode power converters are also employed in off-line applications, wherein the input power is provided by a commercial utility, and it is desired that the power supply provide power factor correction in addition to maintaining a regulated voltage at the output of the power supply.

In battery-operated systems, the efficiency of the power converter is extremely important. Not only should the converter be highly efficient at maximum load, but it is also desirable to maintain efficiency under light- or no-load conditions. In off-line applications, where the input power is received from a commercial utility line, it is also necessary, in order to achieve "green" status, that the converter consume minimum power during light- and no-load conditions.

Furthermore, it is also desired to maintain efficiency over a large input voltage range, typically 4:1. It is very difficult to achieve high efficiency over a wide range of input voltages and variations in load requirements. Typically, converters are designed to have a maximum operating efficiency at 75% of rated output power. As a consequence, however, such converters are usually very inefficient under light-load conditions.

A switched-mode power converter generally includes an inductor, or transformer, coupled to an input power source and a switching transistor. When the switching transistor is on, energy is supplied to the inductor or transformer from the input power source. When the switching transistor is off, the output stage, comprised of a rectifying diode and output capacitor, receives energy from the inductor and the input voltage source. The operation of the switching transistor is controlled such that the converter output voltage is well-regulated. One of the principal contributors to converter losses, and thus inefficiency of operation, however, is turn-on losses in the switching transistor. This is particularly true when a converter is operated under light- or no-load conditions [e.g., operating in a discontinuous conduction mode ("DCM")].

Accordingly what is needed in the art is a switching power converter, and method of operation thereof, with improved light- and no-load efficiency when operating in the DCM at nearly constant switching frequency.

SUMMARY OF THE INVENTION

To address the aforementioned deficiencies, the present invention provides, for use with a power supply having a controllable switch that switches in response to a drive signal received from a drive signal generator, a circuit for, and method of, modifying the drive signal to cause the switch to turn on at a reduced voltage. The circuit includes: (1) a synchronization signal generating circuit that senses an electrical characteristic of the supply representing a voltage across the switch, the synchronization signal generating circuit developing a synchronization signal as a function of the characteristic and (2) a drive signal modifier circuit that receives the synchronization signal and causes the drive signal generator to modify the drive signal in response thereto, the synchronization signal generating circuit and drive signal generator cooperating to synchronize the drive signal to the characteristic and thereby reduce power dissipation in the switch.

In an alternative embodiment of the present invention, the switch is a field effect transistor ("FET"). FETs are commonly employed in switch-mode power supplies because of their fast switching characteristics. Other types of controllable switches are, however, within the scope of the present invention.

In an alternative embodiment of the present invention, the drive signal is a pulse-width modulated ("PWM") signal. Switch-mode power converters commonly employ PWM circuits that, in response to signals indicative of characteristics of the power supply operation, alter the drive signal to the controllable switch to thereby regulate the operation of the power converter. Other control schemes, however, are within the broad scope of the present invention.

In an alternative embodiment of the present invention, the electrical characteristic sensed by the synchronization signal generating circuit is a voltage across the controllable switch. The synchronization signal generating circuit generates pulses upon sensing a maximum value of the electrical characteristic. Those skilled in the art should recognize that the principles of the present invention may be employed by sensing other electrical characteristics, such as current, and that such embodiments are within the broad scope of the present invention.

In an alternative embodiment of the present invention, the synchronization signal comprises a plurality of pulses, the drive signal modifier circuit causing the drive signal generator to superpose the pulses on an intermediate waveform developed within the drive signal generator, and employed by the drive signal generator to develop the drive signal, the pulses thereby temporally advancing the drive signal. PWM controllers, used in switch-mode power converters, typically employ a constant frequency circuit that produces an intermediate waveform used by the drive signal generation circuitry within the PWM. The present invention discloses a circuit and method operative to modify the intermediate waveform utilized by such PWMs, thereby effecting a change in the drive signal generated.

In an alternative embodiment of the present invention, the switch-mode power converter includes a transformer having a bias winding coupled to the synchronization signal generating circuit, the synchronization signal generating circuit sensing the electrical characteristic from the bias winding. The bias winding produces a voltage that is proportional to the voltage across a controllable switch.

In an alternative embodiment of the present invention, the synchronization signal generating circuit includes a zener diode for limiting the voltage of the synchronization signal pulses. By limiting the peak voltage of the synchronization pulses, the maximum variation in the normal switching frequency of the converter is minimized.

Those skilled in the art should recognize, from the detailed description provided hereafter, that the principles of the present invention may be employed to advantage in virtually all power converter topologies, including AC to DC, DC to AC and power factor-correcting topologies.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

DETAILED DESCRIPTION

Figure 1:
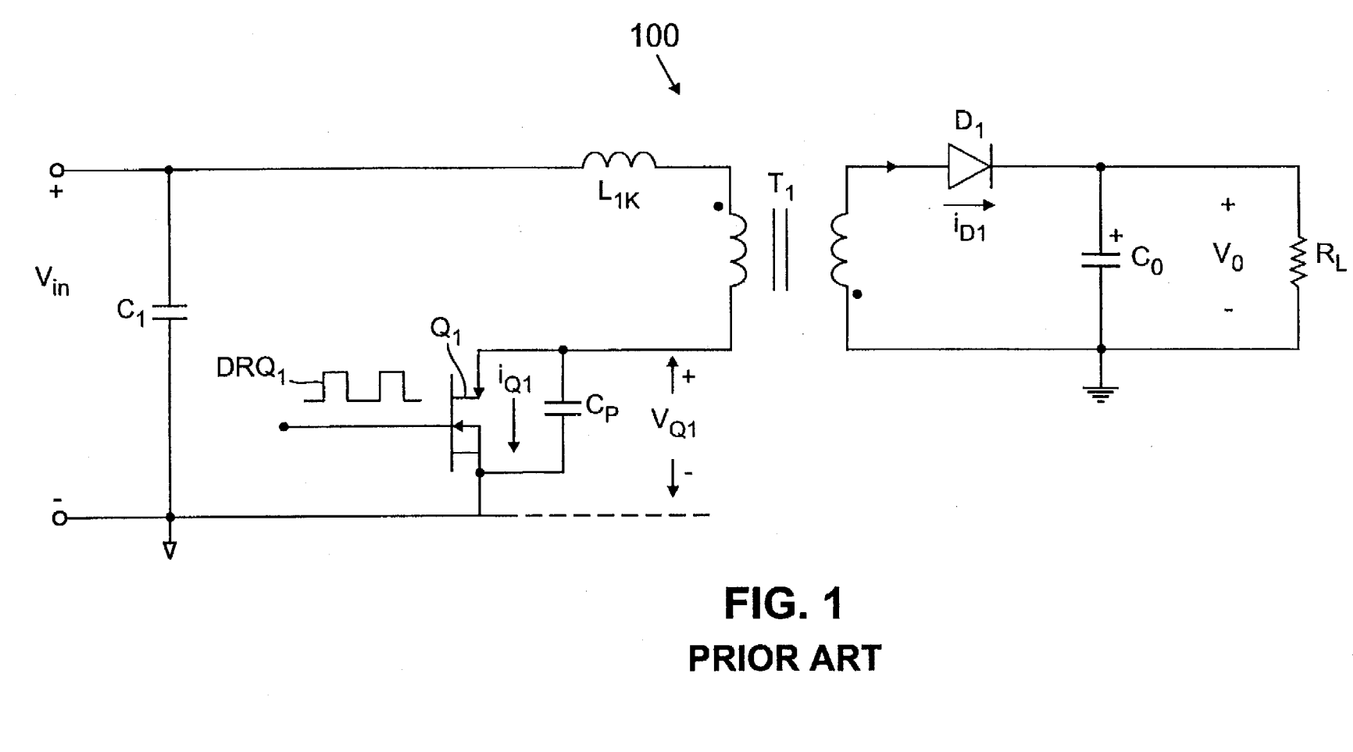
FIG. 1 illustrates a schematic diagram of a prior art flyback converter.

Referring initially to FIG. 1, illustrated is a schematic diagram of a prior art flyback converter 100. The flyback converter 100 includes leakage inductance $L_{lk}$ and parasitic capacitance $C_p$ associated with a switching transistor $Q_1$, transformer $T_1$ and other circuit components. Those skilled in the art should understand the fundamental operation of the flyback converter 100 and should further recognize and address the potential detrimental effects that losses, such as the leakage inductance $L_{lk}$, for a specified drive signal $DRQ_1$, can have on the flyback converter 100.

Figure 2:
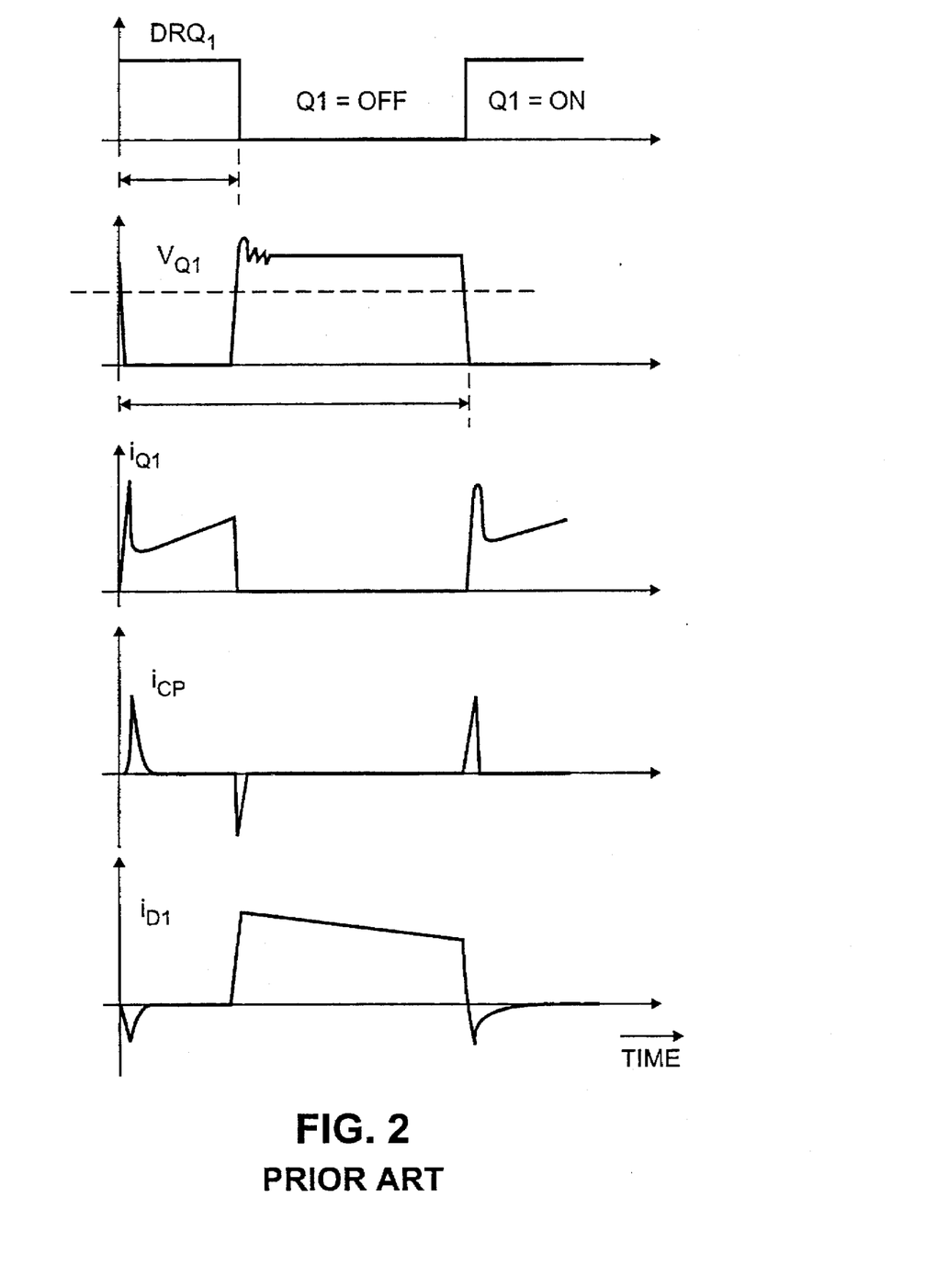
FIG. 2 illustrates timing diagrams for the flyback converter of FIG. 1 operating in a continuous conduction mode ("CCM")
Figure 3:
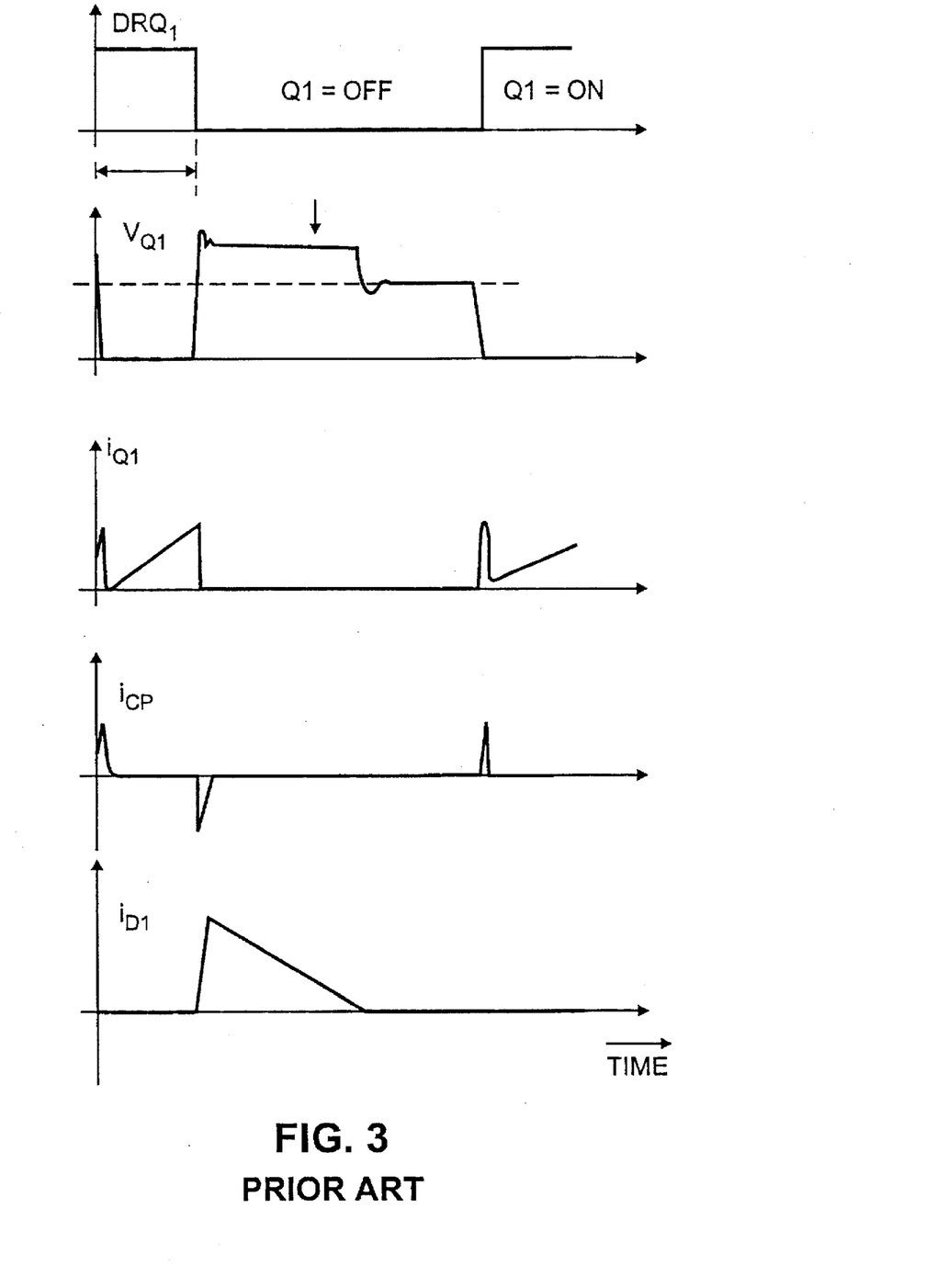
FIG. 3 illustrates timing diagrams for the flyback converter of FIG. 1 operating in a discontinuous conduction mode ("DCM")

Turning now to FIGS. 2 and 3, FIG. 2 illustrates timing diagrams for the flyback converter 100 of FIG. 1 operating in a continuous conduction mode ("CCM"); FIG. 3 illustrates timing diagrams for the flyback converter 100 of FIG. 1 operating in a discontinuous conduction mode ("DCM"). With continuing reference to FIG. 1, the waveform of the turn-on and turn-off for the switching transistor $Q_1$ and associated current $i_{Q1}$ therethrough (demonstrated by turn-on/turn-off waveform and current $i_{Q1}$ waveform, respectively, of FIG. 2) illustrate that there is a high turn-on peak current in the switching transistor $Q_1$ when operating in the CCM. The high turn-on current is generally attributable to a reverse recovery current of a diode $D_1$ associated with the flyback converter 100, and the current associated with discharging the parasitic capacitance $C_p$.

Additionally, the waveform of the turn-on and turn-off for the switching transistor $Q_1$ and associated current $i_{Q1}$ therethrough (demonstrated by turn-on/turn-off waveform and current $i_{Q1}$ waveform, respectively, of FIG. 3) illustrate that there is also a high turn-on peak current in the switching transistor $Q_1$ when operating in the DCM. Again, the high turn-on current is generally attributable to the current associated with discharging the parasitic capacitance $C_p$. Those skilled in the art should recognize that if the peak turn-on current conducted by the switching transistor $Q_1$ is reduced, the efficiency of the flyback converter 100 can be improved.

Figure 4:
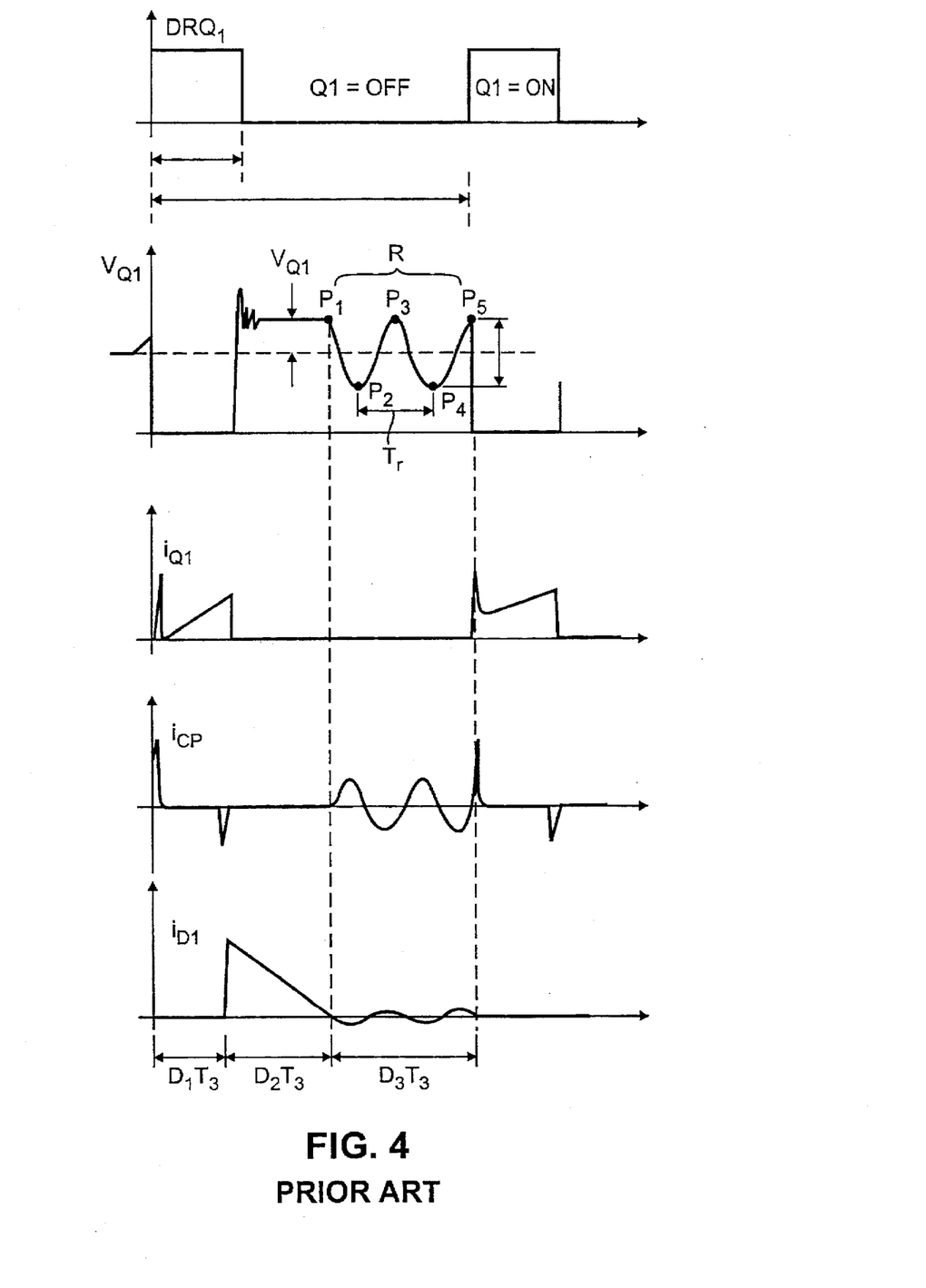
FIG. 4 illustrates timing diagrams for the flyback converter of FIG. 1 operating in the DCM, taking into account the effects of the leakage inductance and parasitic capacitance.

Turning now to FIG. 4, illustrated are timing diagrams for the flyback converter 100 of FIG. 1 operating in the DCM, taking into account the effects of the leakage inductance $L_{lk}$ and parasitic capacitance $C_p$. Again, with continuing reference to FIG. 1, the waveform of the voltage $V_{Q1}$ (see voltage $V_{Q1}$ waveform) across the switching transistor $Q_1$ oscillates during a period $D_3T_3$. During this period of time, both the switching transistor $Q_1$ and diode $D_1$ are off (the flyback converter 100 is operating in the DCM) and a "ringing" (generally designated within range R of the voltage $V_{Q1}$ waveform) is attributable to stray impedances, including the leakage inductance $L_{lk}$ and parasitic capacitance $C_p$. Depending on when the switching transistor $Q_1$ is turned on again, the voltage $V_{Q1}$ across the switching transistor $Q_1$ can range from a maximum peak voltage equal to the sum of the input voltage $V_{in}$ and the reflected output voltage $V_o$, as shown at points $P_1$, $P_3$, $P_5$ of voltage $V_{Q1}$ waveform, to a minimum peak voltage equal to the difference between the input voltage $V_{in}$ and the reflected output voltage $V_o$, as shown at points $P_2$ and $P_4$ of voltage $V_{Q1}$ waveform. The number of oscillations in the voltage $V_{Q1}$ depends on both the circuit design and the operating conditions, and thus there may be many more maximum (e.g. point $P_1$, $P_3$, $P_5$) and minimum (e.g. points $P_2$, $P_4$) peak voltages. Since the power loss due to discharging parasitic capacitance $C_p$ through the switching transistor $Q_1$ is given by $C_p V^2 F_s/2$, it is preferable to turn-on the switching transistor $Q_1$ at a minimum peak voltage (e.g., point $P_2$, $P_4$).

In addition to the power loss due to discharging parasitic capacitance $C_p$ through the switching transistor $Q_1$, there are additional power losses in the switching transistor Q1 due to non-zero turn-on current. As the input voltage $V_{in}$ increases, the non-zero turn-on current can become the dominant source of losses within the switching transistor $Q_1$. To improve the overall efficiency of flyback converter 100, therefore, the losses attributable to turn-on currents should be minimized. The power losses associated with the non-zero turn-on current, however, can also be minimized by turning on the switching transistor $Q_1$ when the voltage $V_{Q1}$ thereacross is at a minimum peak voltage (e.g., point $P_2$, $P_4$). Stated another way, the objective is to achieve zero-voltage switching across the switching transistor $Q_1$.

Conventionally, the prior art includes power converters (e.g., the flyback converter 100) designed to operate at a boundary between the CCM and DCM. The flyback converter 100, operating at the boundary between CCM and DCM, generally employs variable-frequency pulse-width modulators ("PWMs") to turn-on the switching transistor $Q_1$ at the point $P_1$, corresponding to the point in time when the current $i_{D1}$ (illustrated in current $i_{D1}$ waveform) through the diode $D_1$ reaches a value of zero. The principle disadvantage of this solution is that it requires a wide switching-frequency range, typically in the range of 10:1 or greater. To minimize the maximum operating frequency, the flyback converter 100 is designed to operate at very low switching frequencies under nominal load. Whereas the required physical size of circuit components increase for low frequencies, the prior art solutions yield an increase in overall size of the flyback converter 100. Furthermore, to design the flyback converter 100 to withstand very high switching frequency operation requires more expensive magnetic components semiconductor devices and control circuitry. Those skilled in the art should recognize that when the flyback converter 100 operates at very high frequency under light loading, turn-on losses in the switching transistor Q1 could be equal to the total power losses in the switching transistor Q1 when operated at low switching frequency under nominal load. Therefore, to reduce the variation in switching frequency caused by turning on the switching transistor $Q_1$ before the normal switching point (e.g., point $P_5$ in voltage $V_{Q1}$ waveform), it is preferable to induce the switching transistor $Q_1$ to turn-on at a minimum peak voltage preceding the normal switching point (e.g., point $P_4$ of voltage $V_{Q1}$ waveform).

Figure 5:
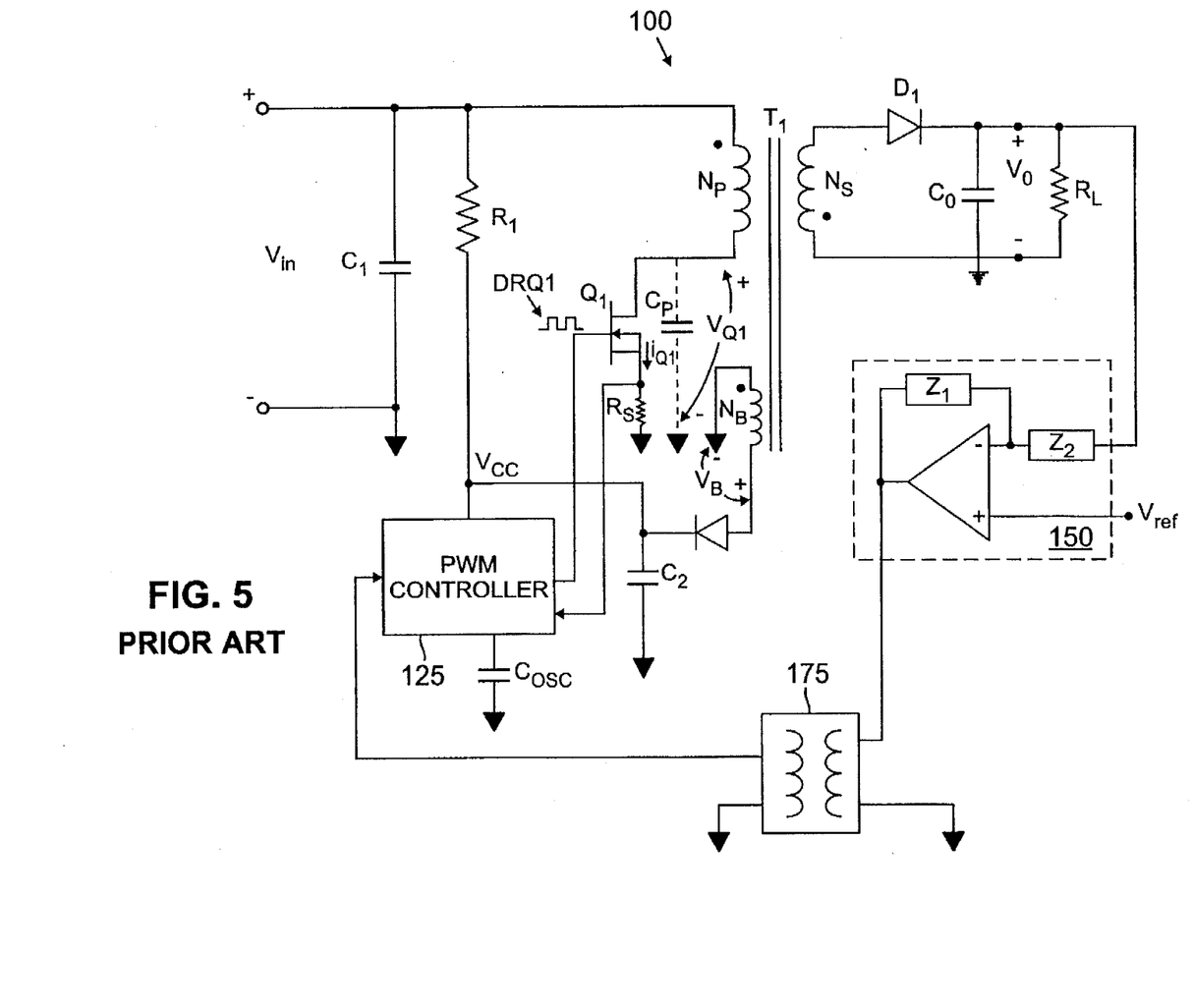
FIG. 5 illustrates another schematic diagram of the flyback converter of FIG. 1.

Turning now to FIG. 5, illustrated is another schematic diagram of the flyback converter 100 of FIG. 1. The flyback converter 100 also includes an input capacitor $C_1$, inductor ("transformer") $T_1$, switching transistor $Q_1$, diode $D_1$ and output capacitor $C_o$. A capacitance $C_p$, shown across the switching transistor $Q_1$, is the equivalent to the parasitic capacitance $C_p$ in the flyback converter 100. The current through the switching transistor $Q_1$ is sensed with a resistor $R_s$ and the sensed voltage is directed to an input of a PWM controller 125. The transformer $T_1$ includes a primary winding $N_p$, secondary winding $N_s$ and a bias or auxiliary winding $N_B$. When the flyback converter 100 is initially started, the supply voltage $V_{cc}$ for the PWM controller 125 is provided from the capacitor $C_2$, which is charged from the input voltage $V_{in}$ through resistor $R_1$. When the output voltage $V_o$ is within regulation, the supply voltage $V_{cc}$ for the PWM controller 125 is provided from the bias winding $N_B$. The output voltage $V_o$ is compared by an error amplifier 150 with a reference voltage $V_{ref}$. The output of the error amplifier 150 is directed to the PWM controller 125 through a feedback isolation block 175. Constant frequency operation is provided by charging and discharging the capacitor $C_{osc}$, as described with reference to FIGS. 6 and 7. The PWM controller 125, in response to the voltage on the capacitor $C_{osc}$ and the output of the error amplifier 150, generates a drive signal $DRQ_1$ that controls the operation of the switching transistor $Q_1$ to regulate the output of the flyback converter 100.

Figure 6:
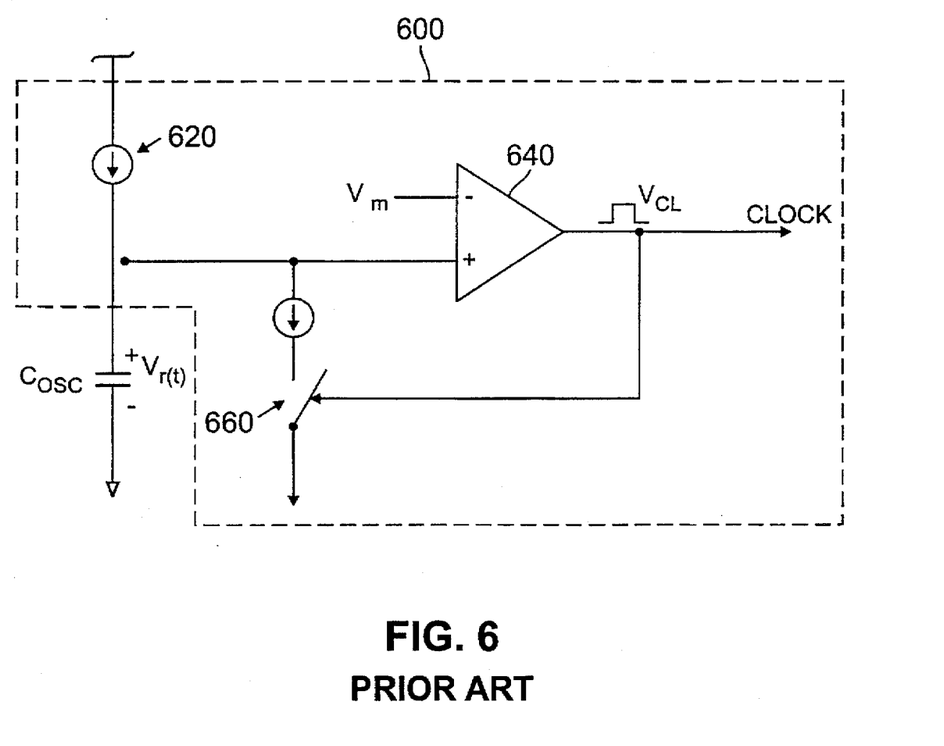
FIG. 6 illustrates a schematic diagram of a constant frequency circuit employed within the PWM controller of the flyback converter of FIG. 5.
Figure 7:
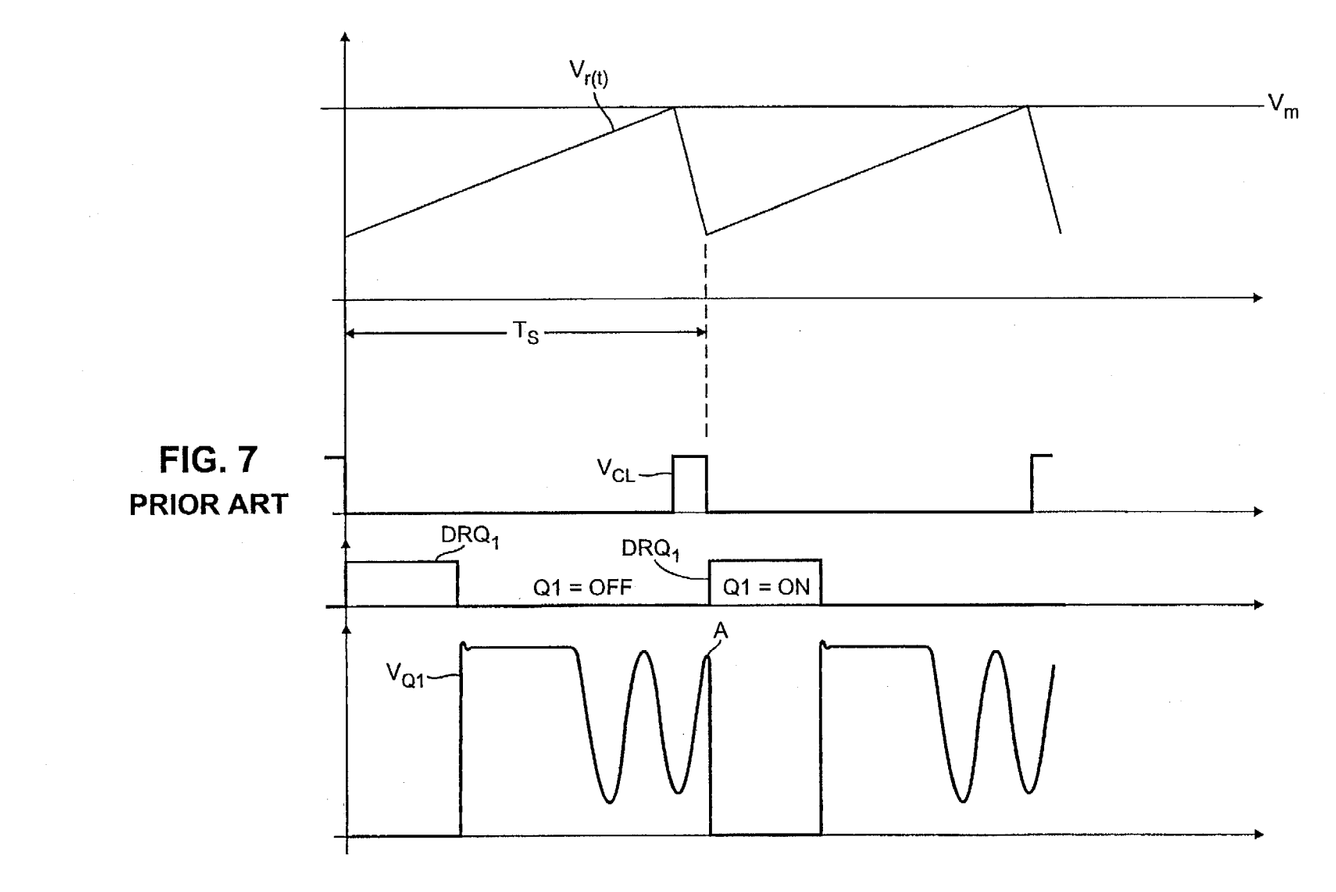
FIG. 7 illustrates timing diagrams for the constant frequency circuit of FIG. 6 employed within the PWM controller of FIG. 5.

Turning now to FIGS. 6 and 7, FIG. 6 illustrates a schematic diagram of a constant frequency circuit 600 employed within the PWM controller 125 of the flyback converter 100 of FIG. 5; FIG. 7 illustrates timing diagrams for the constant frequency circuit 600 of FIG. 6 employed within the PWM controller 125 of FIG. 5. With continuing reference to FIG. 5, the constant frequency circuit 600 may be integrated into the PWM controller 125 (as shown) or may be constructed from discrete components. A capacitor $C_{osc}$ is charged by a current source 620 (e.g., a resistor) providing a nearly linear rise of the capacitor voltage $V_{R(t)}$ (as demonstrated by voltage $V_{R(t)}$ waveform of FIG. 7). When the voltage $V_{R(t)}$ is equal to a predetermined threshold voltage $V_m$, a comparator 640 generates a voltage pulse $V_{CL}$ causing a switch 660 to close and thereby discharge the voltage $V_{R(t)}$ on the capacitor $C_{osc}$. Once the capacitor $C_{osc}$ is discharged, the output of comparator 640 goes low causing the switch 660 to open, thus allowing the capacitor $C_{osc}$ to begin charging again. At this point, the PWM controller 125 generates the drive signal $DRQ_1$ turning-on the switching transistor $Q_1$. The resulting waveform of the voltage $V_{Q1}$ across the switching transistor $Q_1$ (as shown by voltage waveform of FIG. 7), demonstrates that switching can occur at a point in time when the voltage $V_{Q1}$ is at a peak maximum voltage (reference A, voltage $V_{Q1}$ waveform of FIG. 7), thereby providing undesired turn-on losses in the switching transistor $Q_1$.

Figure 8:
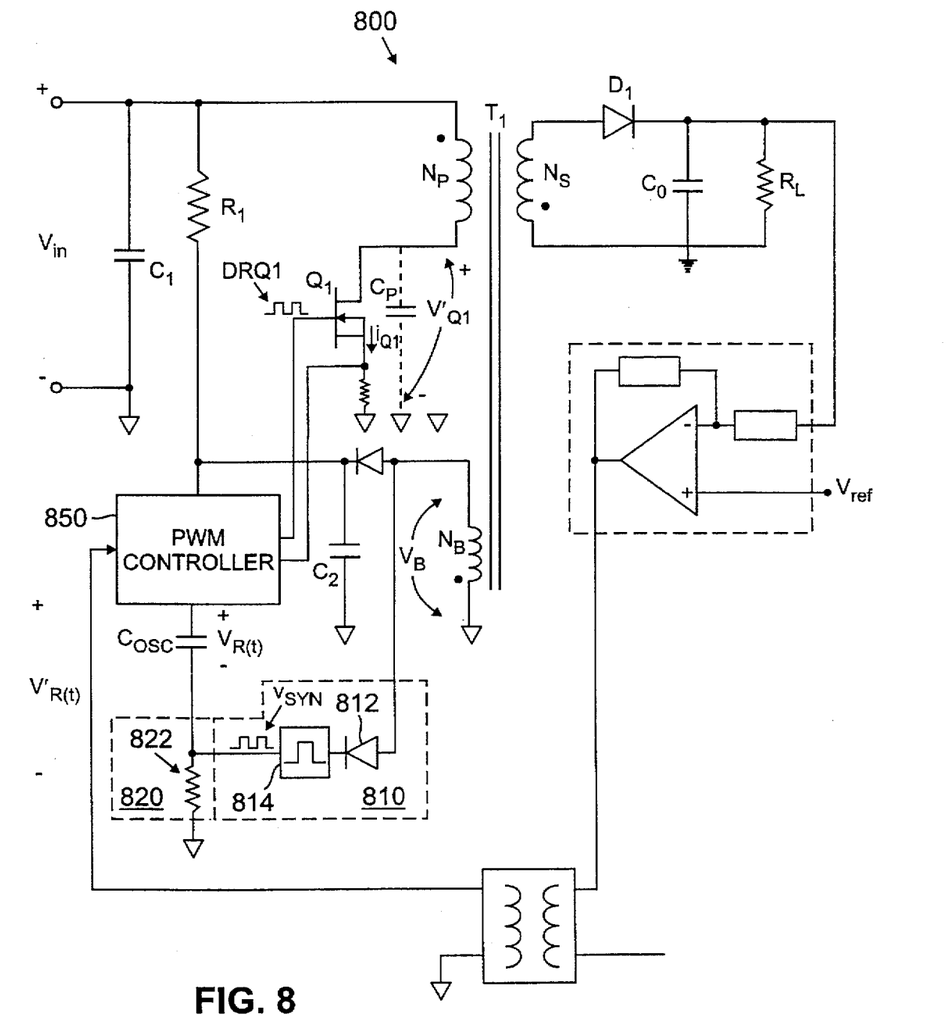
FIG. 8 illustrates a schematic diagram of a flyback converter employing a control circuit constructed in accordance with the principles of the present invention.

Turning now to FIG. 8, illustrated is a schematic diagram of a flyback converter 800 employing a control circuit constructed in accordance with the principles of the present invention. The control circuit of the present invention is embodied in a synchronization signal generating circuit 810 and a drive signal modifier circuit 820. The synchronization signal generating circuit 810 includes a rectifying element 812 and pulse shaping circuit 814. The drive signal modifier circuit 820 is embodied in a resistor 822 in the illustrated embodiment. The remainder of the components illustrated in the flyback converter 800 are analogous to the components of the flyback converter 100 described with respect to FIGS. 1 and 5.

Figure 9:
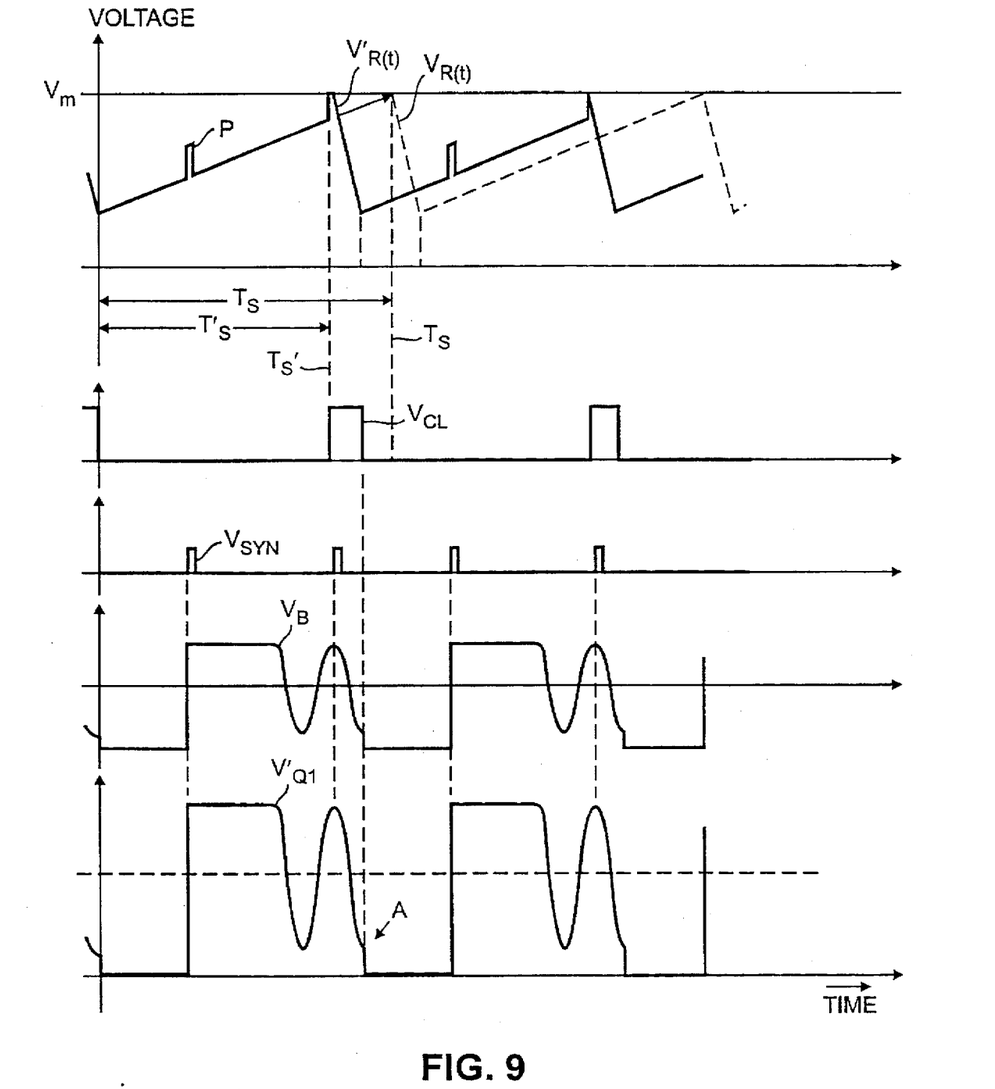
FIG. 9 illustrates timing diagrams for the flyback converter of FIG. 8 operating in a DCM.

Turning now to FIG. 9, illustrated are timing diagrams for the flyback converter of FIG. 8 operating in a DCM. With continuing reference to FIG. 8, the transformer bias winding $N_B$ produces a voltage signal $V_B$ proportional to the voltage $V'_{Q1}$ across the switching transistor $Q_1$. The voltage signal $V_B$ is rectified by the rectifying element 812 and then shaped by the pulse shaping circuit 814. In the illustrated embodiment, the pulse shaping circuit 814 is a monostable multivibrator (one shots) circuit thereby providing a short duration pulse (as demonstrated by pulse P on voltage $V'_{R(t)}$ waveform). The resulting synchronization signal waveform $V_{syn}$ comprises a plurality of pulses temporally corresponding to the peak maximum voltages $V'_{Q1}$ across the switching transistor $Q_1$ (see voltage $V_{syn}$ waveform). The synchronization signal waveform $V_{syn}$ is coupled to the drive signal modifier circuit 820 (coupled in series between the capacitor $C_{osc}$ and the circuit ground) such that the synchronization signal waveform $V_{syn}$ is superposed on the normal capacitor voltage $V_{R(t)}$ waveform, resulting in a new voltage $V'_{R(t)}$ (see voltage $V'_{R(t)}$ waveform). The amplitude, as well as the duration, of the pulses including the synchronization signal waveform $V_{syn}$ are preferably selected such that the last pulse in a given switching period induces the capacitor voltage $V'_{R(t)}$ to exceed the predetermined threshold voltage $V_m$.

When the capacitor voltage $V'_{R(t)}$ exceeds the threshold voltage $V_m$, a comparator (not shown), associated with a PWM controller 850, generates a voltage pulse $V_{CL}$ at a time $T_s'$, rather than the normal time $T_s$, causing a switch, associated with the PWM controller 850, to close, thereby discharging the voltage $V'_{R(t)}$ on the capacitor $C_{osc}$. Once the capacitor $C_{osc}$ is discharged, the output of comparator goes low causing the switch to open, thereby allowing the capacitor $C_{osc}$ to begin charging again.

The discharge time of the capacitor $C_{osc}$ is preferably designed to be approximately equal to one-half of the period of the oscillation $T_r$ (see reference in FIG. 4) for the voltage $V'_{Q1}$ across the switching transistor Q1. Therefore, the maximum variation in a switching period is given by:

$$\frac{\Delta T_s}{T_s} = \frac{-T_r}{2 \cdot T_s}$$

where $T_r$ is the period of oscillation of the voltage $V'_{Q1}$ across the switching transistor Q1 and $T_s$ is the original switching period of the flyback converter 800.

Those skilled in the art should recognize that although the charging time of the capacitor $C_{osc}$ is slightly reduced, the discharge time is substantially unaffected, thus resulting in only a slight increase in the flyback converter 800 switching frequency. Furthermore, an examination of the resulting voltage $V'_{Q1}$ across the switching transistor $Q_1$ reveals that the switching occurs at a point (reference A in FIG. 9) when the voltage $V'_{Q1}$ is at a peak minimum, thus resulting in reduced turn-on losses in the switching transistor $Q_1$ and, therefore, improved overall efficiency for the flyback converter 800 at nearly constant operating frequency.

Figure 10:
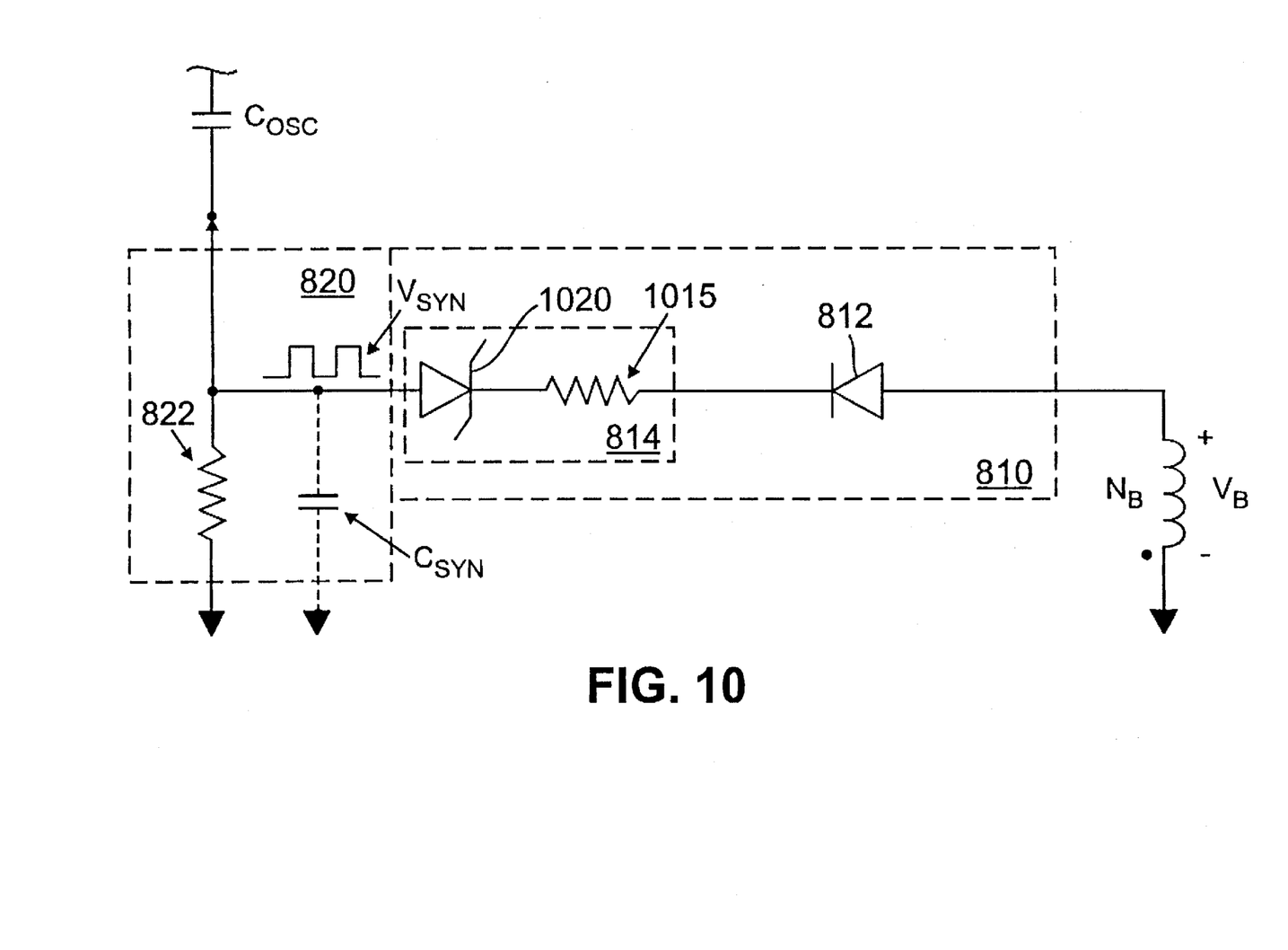
FIG. 10 illustrates another embodiment of the control circuit of the present invention employed in the flyback converter of FIG. 8.

Turning now to FIG. 10, illustrated is another embodiment of a control circuit of the present invention employed in the flyback converter 800 of FIG. 8. As previously mentioned, the control circuit constructed in accordance with the principles of the present invention is embodied within the synchronization signal generating circuit 810 and the drive signal modifier circuit 820. The synchronization signal generating circuit 810 includes the rectifying element 812 and pulse shaping circuit 814. The pulse shaping circuit 814, however, includes a resistor 1015 and zener diode 1020. Additionally, the drive signal modifier circuit 820 is embodied in a resistor 822 and an additional capacitor $C_{syn}$ in the illustrated embodiment.

Figure 11:
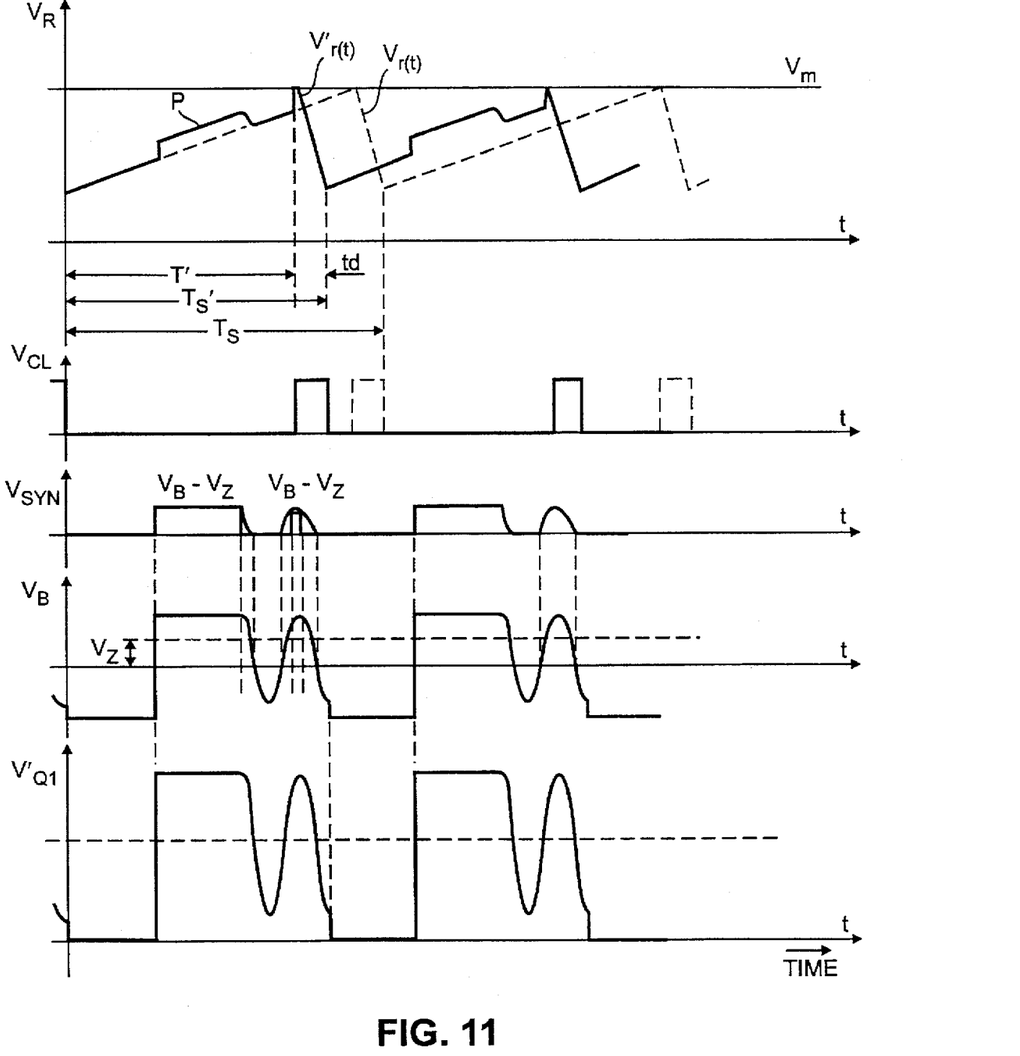
FIG. 11 illustrates timing diagrams for the flyback converter of FIG. 8 employing the control circuit of FIG. 10 and operating in a DCM.

Turning now to FIG. 11, illustrated are timing diagrams for the flyback converter 800 of FIG. 8 employing the control circuit of FIG. 10 and operating in the DCM. With continuing reference to FIGS. 8 and 10, the transformer bias winding $N_B$ produces a voltage signal $V_B$ proportional to the voltage $V'_{Q1}$ across switching transistor $Q_1$. The voltage signal $V_B$ (see voltage $V_B$ waveform) is rectified by the diode 812, scaled by a resistor 1015, and the peak is limited by a zener diode 1020, to thereby produce a synchronization signal waveform $V_{syn}$ (see voltage $V_{syn}$ waveform) that includes a plurality of pulses temporally corresponding to the peak maximum voltages $V'_{Q1}$ across the switching transistor $Q_1$. The synchronization signal waveform $V_{syn}$ is coupled to the resistor 822, (coupled in series between the capacitor $C_{osc}$ and the circuit ground) such that the synchronization signal waveform $V_{syn}$ is superposed on the normal capacitor voltage $V_{R(t)}$ waveform, resulting in a new voltage $V'_{R(t)}$. As opposed to the control circuit discussed with respect to FIGS. 8 and 9, the synchronization signal waveform $V_{syn}$ that is superposed on the normal capacitor voltage $V_{R(t)}$ waveform to form the voltage $V'_{R(t)}$ includes a pulse (designated by reference P on voltage $V'_{R(t)}$ waveform) longer in duration than the equivalent pulse illustrated in FIG. 9 (see pulse P on voltage $V'_{R(t)}$ waveform of FIG. 9). The pulse is longer in duration because the synchronization signal waveform $V_{syn}$ is a function of the voltage $V_B$ rectified by the voltage $V_z$ across the zener diode 1020 (as demonstrated by voltage $V_{syn}$ waveform).

The amplitude and duration of the pulses including the synchronization signal waveform $V_{syn}$ are preferably selected such that the last pulse in a given switching period induces the capacitor voltage $V'_{R(t)}$ to exceed the predetermined threshold voltage $V_m$. This is accomplished by proper selection of the component values for the resistors 822, 1015 and the zener diode 1020. The synchronization signal generating circuit 810 includes the zener diode 1020 for limiting the voltage of the synchronization signal pulses. By limiting the peak voltage of the synchronization pulses, the maximum variation in the normal switching frequency of the flyback converter 800 is minimized. Furthermore, the capacitor $C_{syn}$ delays the pulses including the synchronization signal waveform $V_{syn}$, thus allowing additional control over the switching frequency. Those skilled in the art should understand that the control circuit (including the zener diode 1020) is a representative alternative embodiment of the present invention and variations that accomplish the same or similar objective are well within the broad scope of the present invention.

Although the present invention has been described in detail, those skilled in the art should understand that they can make various changes, substitutions and alterations herein without departing from the spirit and scope of the invention in its broadest form.

What is claimed is:

1. For use with a power supply having a controllable switch that switches in response to a drive signal received from a drive signal generator, a circuit for modifying said drive signal to cause said switch to turn on at a reduced voltage, comprising:

a synchronization signal generating circuit that senses an electrical characteristic of said supply representing a voltage across said switch, said synchronization signal generating circuit developing a synchronization signal as a function of said characteristic; and a drive signal modifier circuit that receives said synchronization signal and causes said drive signal generator to modify said drive signal in response thereto, said synchronization signal generating circuit and drive signal generator cooperating to synchronize said drive signal to said characteristic thereby to reduce power dissipation in said switch.

2. The circuit as recited in claim 1 wherein said switch is a field effect transistor (FET).

3. The circuit as recited in claim 1 wherein said drive signal is a pulse width modulated signal.

4. The circuit as recited in claim 1 wherein said characteristic oscillates, said synchronization signal generating circuit generating pulses upon sensing a maximum value of said characteristic.

5. The circuit as recited in claim 1 wherein said synchronization signal comprises a plurality of pulses, said drive signal modifier circuit causing said drive signal generator to superpose said pulses on an intermediate waveform developed within said drive signal generator and employed by said drive signal generator to develop said drive signal, said pulses thereby temporally advancing said drive signal.

6. The circuit as recited in claim 1 wherein said supply comprises a transformer having a bias winding coupled to said synchronization signal generating circuit, said synchronization signal generating circuit sensing said characteristic from said bias winding.

7. The circuit as recited in claim 1 wherein said synchronization signal generating circuit comprises a zener diode for limiting a voltage of pulses in said synchronization signal.

8. For use with a power supply having a controllable switch that switches in response to a drive signal received from a drive signal generator, a method of modifying said drive signal to cause said switch to turn on at a reduced voltage, comprising the steps of:

sensing an electrical characteristic of said supply representing a voltage across said switch;

developing a synchronization signal as a function of said characteristic; and causing said drive signal generator to modify said drive signal in response thereto to synchronize said drive signal to said characteristic thereby to reduce power dissipation in said switch.

9. The method as recited in claim 8 wherein said switch is a field effect transistor (FET).

10. The method as recited in claim 8 wherein said drive signal is a pulse width modulated signal.

11. The method as recited in claim 8 wherein said characteristic oscillates, said step of developing comprising the step of generating pulses upon sensing a maximum value of said characteristic.

12. The method as recited in claim 8 wherein said synchronization signal comprises a plurality of pulses, said step of causing comprising the step of superposing said pulses on an intermediate waveform developed within said drive signal generator and employed by said drive signal generator to develop said drive signal, said pulses thereby temporally advancing said drive signal.

13. The method as recited in claim 8 wherein said supply comprises a transformer having a bias winding coupled to said synchronization signal generating circuit, said step of sensing comprising the step of sensing said characteristic from said bias winding.

14. The method as recited in claim 8 wherein said synchronization signal generating circuit comprises a zener diode, said step of developing comprising the step of limiting a voltage of pulses in said synchronization signal.

15. A power supply, comprising:

a controllable switch that switches in response to a pulse width modulated drive signal;

a drive signal generator, coupled to said switch, for generating said drive signal; and a circuit for modifying said drive signal to cause said switch to turn on at a reduced voltage, including:

a synchronization signal generating circuit that senses an electrical characteristic of said supply representing a voltage across said switch, said synchronization signal generating circuit developing a synchronization signal as a function of said characteristic, and a drive signal modifier circuit that receives said synchronization signal and causes said drive signal generator to modify said drive signal in response thereto, said synchronization signal generating circuit and drive signal generator cooperating to synchronize said drive signal to said characteristic thereby to reduce power dissipation in said switch.

16. The supply as recited in claim 15 wherein said switch is a field effect transistor (FET).

17. The supply as recited in claim 15 wherein said characteristic oscillates, said synchronization signal generating circuit generating pulses upon sensing a maximum value of said characteristic.

18. The supply as recited in claim 15 wherein said synchronization signal comprises a plurality of pulses, said drive signal modifier circuit causing said drive signal generator to superpose said pulses on an intermediate waveform developed within said drive signal generator and employed by said drive signal generator to develop said drive signal, said pulses thereby temporally advancing said drive signal.

19. The supply as recited in claim 15 wherein said supply comprises a transformer having a bias winding coupled to said synchronization signal generating circuit, said synchronization signal generating circuit sensing said characteristic from said bias winding.

20. The supply as recited in claim 15 wherein said synchronization signal generating circuit comprises a zener diode for limiting a voltage of pulses in said synchronization signal.

21. The supply as recited in claim 15 wherein said supply is selected from the group consisting of:

an AC to DC converter, a DC to AC converter, and a power factor-correcting circuit.

* * * * *